Nov. 17, 1959  D. W. FRITZLEN  2,913,572
ANIMATED LIGHT MECHANISM
Filed March 10, 1958  4 Sheets-Sheet 1

INVENTOR.
David W. Fritzlen.
BY
Fishburn and Gold
ATTORNEYS.

Nov. 17, 1959 — D. W. FRITZLEN — 2,913,572
ANIMATED LIGHT MECHANISM
Filed March 10, 1958 — 4 Sheets-Sheet 2

INVENTOR.
David W. Fritzlen.
BY
Fishburn and Gold
ATTORNEYS.

Nov. 17, 1959
D. W. FRITZLEN
2,913,572
ANIMATED LIGHT MECHANISM
Filed March 10, 1958
4 Sheets-Sheet 3
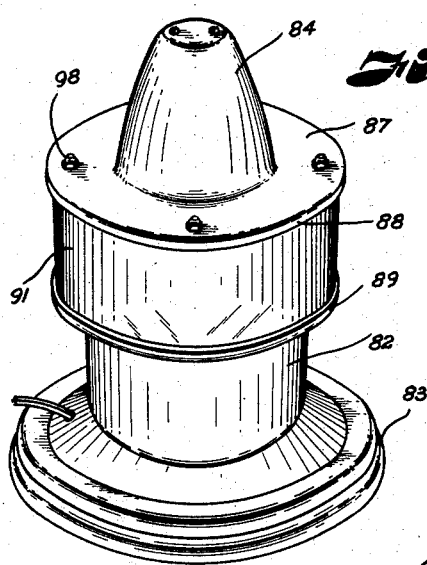
Fig. 4.
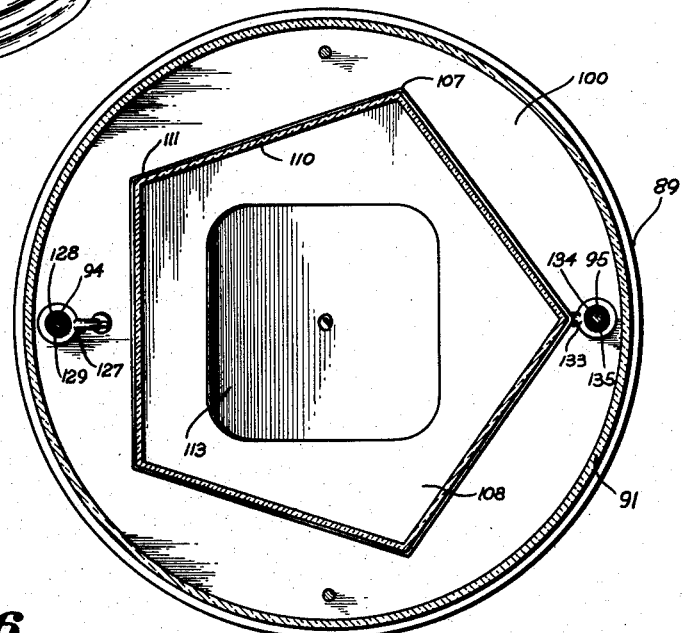
Fig. 5.
Fig. 6.
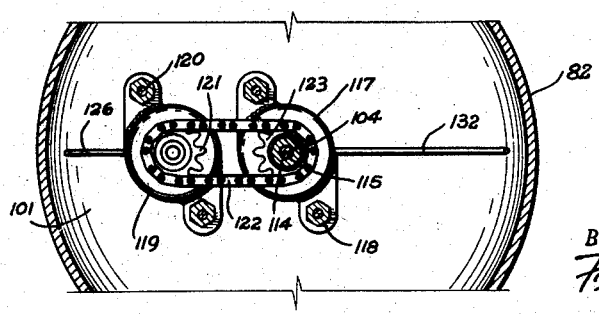
INVENTOR.
David W. Fritzlen.
BY
Fishburn and Gold
ATTORNEYS.

Nov. 17, 1959  D. W. FRITZLEN  2,913,572
ANIMATED LIGHT MECHANISM
Filed March 10, 1958  4 Sheets-Sheet 4

INVENTOR.
David W. Fritzlen.
BY
Fishburn and Gold
ATTORNEYS.

United States Patent Office 2,913,572
Patented Nov. 17, 1959

2,913,572

ANIMATED LIGHT MECHANISM

David W. Fritzlen, Kansas City, Mo.

Application March 10, 1958, Serial No. 720,110

4 Claims. (Cl. 240—10.1)

This invention relates to animated light mechanism, and more particularly to a light structure having moving portions for directing light therefrom in flashes or periodic brightness to attract attention.

The principal objects of the present invention are to provide an animated light mechanism of pleasing appearance which may be used with advertising material or displays to attract attention thereto; to provide such a light that may be easily mounted on gasoline pumps, counters or other supporting structures to emit beacon-like flashes; to provide such a light mechanism with a rotor having a plurality of colored lenses or colored light-transmitting panels; to provide light means and revolving reflectors within the rotor for dispersing of the light through the colored lenses to create a flashing or periodic light effect; to provide such a light mechanism with counter rotating reflectors and lenses whereby the periodic light flashes or beacon are of changing color; and to provide a mechanical device of this character which is compact, sturdy, simple and economical to manufacture, and of low cost operation.

In accomplishing these and other objects of the present invention, I have provided improved details of structure, the preferred forms of which are illustrated in the accompanying drawings, wherein:

Fig. 4 is a perspective view of a modified form of animated light mechanism.

Fig. 5 is a horizontal sectional view through said modified form taken on the line 5—5, Fig. 7.

Fig. 6 is horizontal sectional view showing the drive for rotation of the rotor and reflector taken on the line 6—6, Fig. 7.

Referring more in detail to the drawings:

1 designates an animated light mechanism embodying the features of my invention and having a base 2 supporting a housing 3 each of which may be of various contours to provide a desired shape adapted to be used with other displays or in suitable locations to serve as attention-getters.

Figure 1:
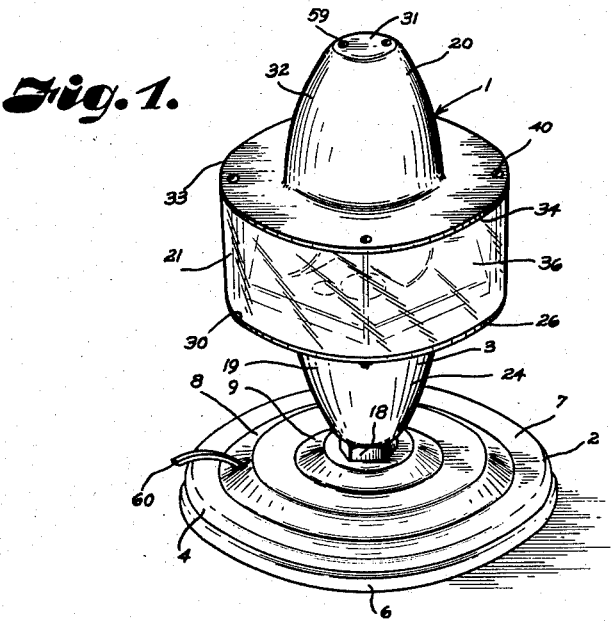
Fig. 1 is a perspective view of an animated light mechanism embodying the features of my invention.

The base 2, as illustrated in Fig. 1, is an inverted hollow shell having a peripheral wall 4 with a bottom edge portion 5 engaged in a supporting ring 6 of soft, non-skid material, such as rubber or the like, adapted to rest on a flat supporting surface; however, the base may be of any suitable structure to be secured to any supporting structure with which the animated light mechanism may be used. The base 2 is preferably made of metal or the like and has an upper wall 7 extending inwardly from the peripheral wall 4 and formed to have raised portions 8 and 9 with the center portion 9 having an opening 10 substantially in the center thereof. The base 2 has a housing mounting member 11 thereon which, in the illustrated structure, has a sleeve portion 12 adapted to be inserted through the opening 10 and extended above the upper wall 7 of the base. The sleeve portion 12 has an annular flange 13 forming a shoulder 14 engaging the bottom surface 15 of the upper wall 7 of the base 2. The sleeve portion 12 has external threads 16 and an internally threaded bore 17 with a nut 18 threaded on said external threads 16 and tightened thereon to draw the shoulder 14 into tight engagement with the upper wall 7 thereby holding the mounting member 11 securely in place.

The housing 3 preferably includes a lower housing portion 19, an upper housing portion 20, and an intermediate housing portion 21. The lower housing portion 19 is preferably a hollow metal member and has a bottom wall 22 with a depending externally threaded tubular extension 23 threaded into the mounting member bore 17. The lower housing portion 19 has side walls 24 inclined upwardly and outwardly from the bottom wall 22 and defining a chamber 25 having an open top, said side walls 24 terminating at their upper ends in an annular flange 26 extending outwardly therefrom. The inner portion of the upper surface 27 of the flange 26 is provided with a recess or counterbore 28 to receive a plate member 29, as later described. The peripheral edge of the flange 26 has an undercut upper portion forming an annular groove 30. The upper housing portion 20 is preferably of substantially the same structure as the lower housing portion except it is inverted and the top wall 31 has no extension. This permits use of the same molds or forming tools for making both the upper and lower housing portions. The upper housing portion has side walls 32 terminating at their lower edges in an outwardly extending annular flange 33 having an undercut periphery to form a downwardly facing annular groove 34. The upper housing portion 20 is hollow, having a chamber 35 therein open at the bottom thereof.

The upper and lower housing portions are aligned in vertically spaced relation and a transparent non-colored vertical wall 36 arranged with its lower edge 37 seated in the annular groove 30 and its upper edge 38 seated in the annular groove 34 in the flange 33 of the upper housing portion. With this mounting, the flanges 26 and 33 cooperate with the wall 36 to define the intermediate housing portion having a compartment 39 therein. Bolts 40 extend through aligned bores 41 in the flanges 26 and 33 and have nuts 42 threaded on their lower ends 43 whereby the transparent wall 36 and the upper and lower housing portions are secured together in a substantially watertight structure to protect the apparatus contained in the compartment 39.

Figure 3:
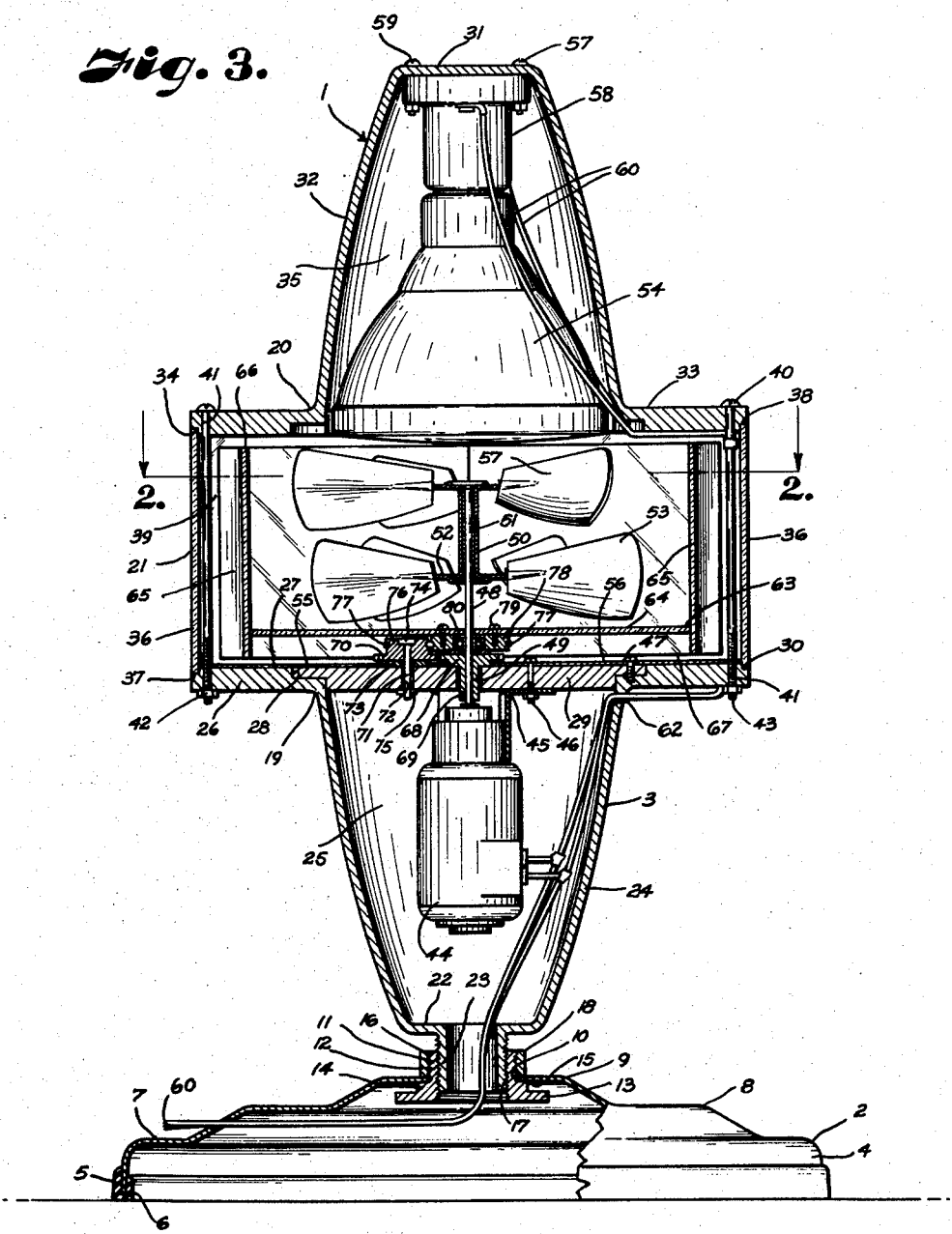
Fig. 3 is a vertical sectional view through the animated light mechanism.
Figure 7:
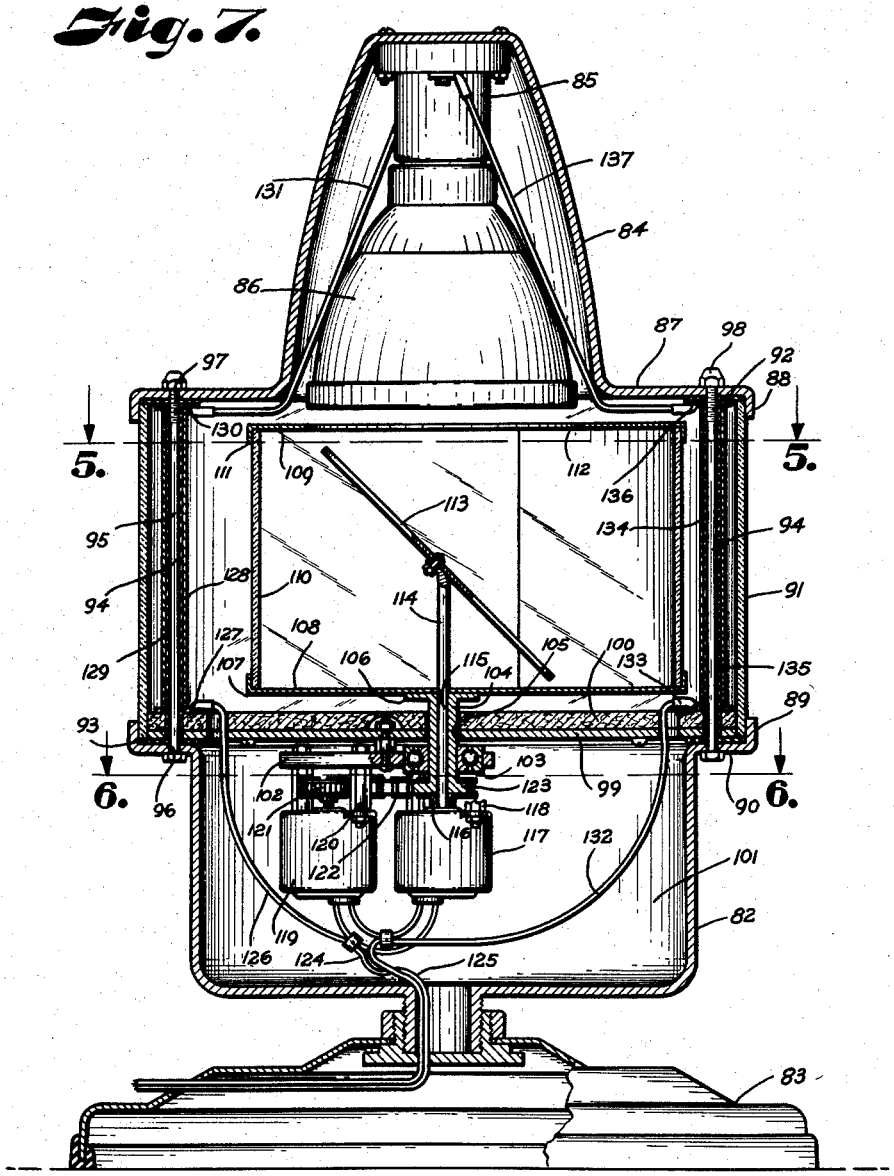
Fig. 7 is a vertical sectional view through the modified form of the animated light mechanism.

An electric motor 44 is located in the chamber 25 of the hollow lower housing portion 19 and, as shown in Fig. 3, is secured by a bracket 45 and fastening devices such as bolts 46 in suspended relation from the plate member 29. The plate member 29 closes the upper opening of the chamber 25 and is secured to the flange 26 by fastening devices such as screws 47. The motor 44 has a drive shaft 48 extending upwardly through a central or axial opening 49 in the plate member 29 and into the compartment 39. A sleeve-like hub 50 is secured on the upper portion of the shaft 48 by a set screw 51, and said hub has a plurality of spaced radially extending arms 52. A blade member 53 is on each arm 52 and, as shown in Fig. 3, the blades are broad and inclined to the horizontal plane of the arms. One set of blades may be used or there may be a plurality of groups arranged in vertically spaced relation on the shaft 48 or hub member 50. In the illustrated structure, there are two groups of blades on the hub 50, and the blades are in staggered relation to each other whereby they are exposed to light emitting from a light source 54 in the upper housing portion 20 and to light reflected from a reflecting surface 55 of a covering sheet 56 secured to the upper surface of the flange 26 and plate 29. The blade members 53 are curved or convex on the face 57 or leading face relative to the direction of rotation of said blades, and the inclination is such that light rays from the light source or lamp 54 in the upper housing portion is reflected substantially in a horizontal plane through the transparent wall 36. The light source 54 is preferably a light bulb supported in a socket 58 secured to the top wall 31 by suitable fastening devices such as screws 59, electrical energy being supplied to the socket and light bulb through electrical conductors 60 that extend from the socket then along the bottom surface of the flange 33 along the inside of the wall 36 and through apertures 61 in the flanges 26 and apertures 62 in the wall 24 through the tubular extension 23 and then through the base member. The motor 44 is also connected to the conductors 60 whereby the motor and light are energized at the same time.

A rotor or turn table structure 63 is arranged in the compartment 39 and consists of a bottom member 64 of transparent material rotatably mounted on the motor shaft 48. The rotor or turn table has a plurality of upwardly extending colored light-transmitting panels 65, with the side edges of one panel abutting the side edge of the adjacent panel. In the illustrated structure, the bottom member 64 has a five-sided periphery and the panels 65 are secured thereto whereby the upper edges 66 of said panels have clearance with the flanges 33 and the lower edges 67 have clearance above the cover sheet 56. It is preferable that each of the panels 65 be of a different color to provide a changing color to the light directed in any direction. It is also preferable that the turn table 63 rotate in an opposite direction to the direction of rotation of the blades 53. The bottom wall 64 of the turn table is spaced above the cover sheet 56 to provide space therebetween for the driving mechanism for the turn table. In the structure illustrated, a gear 68 is mounted on the motor shaft 48 with a hub of said gear extending through the opening 49 in the plate member 29 and fixed to said shaft as by a set screw or other suitable fastening device 69. The gear 68 meshes with a gear 70 rotatably mounted on a shaft 71 supported in an aperture 72 in the plate member 29, a washer 73 being interposed between the gear 70 and said plate member and a head 74 on said shaft 71 cooperates with a pin 75 to eliminate end motion of the gear 70. The gear member 70 has a grooved pulley portion 76 operatively connected by a belt or other flexible driving member 77 with a pulley 78 fixed on the bottom of the bottom wall 64 of the turn table by means of suitable fastening devices 79. A bearing 80 is arranged in the pulley 78 to rotatably mount the turn table 63 about the motor shaft 48.

In using an animated light mechanism constructed and assembled as described, it is mounted on a suitable support and the conductors 60 connected to a suitable source of electric current to energize the motor 44 and the light source or lamp 54 whereby light from the lamp is directed downwardly to be reflected from the reflecting surface 57 of the blades 53. Energization of the motor rotates the motor shaft 58 and the blades in one direction and through the gears 68 and 70 and belt 77 connecting the pulleys 76 and 78 the turn table is rotated in the opposite direction to the blades 53, providing a counter-rotating arrangement whereby from any one position the color of the light directed to the sides of the mechanism through the walls 36 changing color. The light directed downwardly from the lamp is reflected from surfaces 57 and from any one position at the side of the mechanism each blade as it passes a certain portion of its rotation will direct light to the viewer in said position, giving a flashing or periodic light effect which, together with the changing color of said viewed light, tends to attract attention to the mechanism and its surroundings. Furthermore, the counter-rotating of the blades and turn table provide a further attention-attracting motion.

Figure 2:
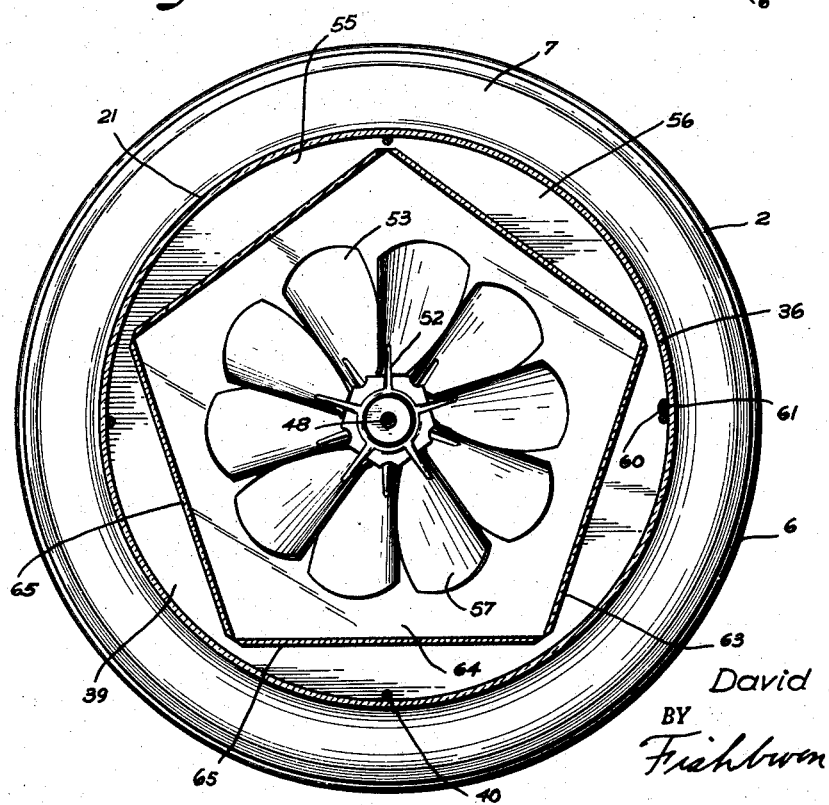
Fig. 2 is a horizontal sectional view through the light mechanism taken on the line 2—2, Fig. 3.

In the form of the invention illustrated in Figs. 4 to 7 inclusive, the lower housing 82 is mounted on a suitable support or base member 83 substantially the same as in the structure shown in Figs. 1 to 3 inclusive. The upper housing 84 contains a lamp socket 85 for mounting an electric lamp 86 for directing light downwardly therefrom. The upper housing is spaced above the lower housing in alignment therewith, said upper housing having an outwardly extending flange 87 terminating in a downwardly turned flange 88 which aligns with an upwardly extending flange 89 on an outwardly extending flange 90 of the lower housing 82. A transparent, non-colored vertical wall 91, illustrated in the form of a hollow cylinder, is arranged between the flanges 87 and 90 with the flanges 88 and 89 engaging said vertical wall adjacent the end thereof to contain same therein. Gaskets 92 and 93 are interposed between the upper edge of the wall 91 and the flange 87, and the lower edge of the wall and the flange 90, respectively, with suitable fasteners 94 holding the upper and lower housing members in assembled relation whereby said gaskets are compressed to make a watertight connection. The fasteners 94 are preferably in the form of bolts having shanks 95 extending through apertures 96 and 97 in the flanges 90 and 87 respectively, with suitable nuts 98 threaded on said bolt shanks to hold the structure assembled.

A plate member 99 closes the upper end of the lower housing 82 and has its marginal portions resting on the gasket 93. A suitable layer of heat insulation 100 preferably in the form of a compressed fibrous board rests on the plate 99 to reduce the transfer of heat from the light 86 into the chamber 101 in the lower housing 82. A bracket 102 is supported from the plate 99 in depending relation in the chamber 101 and has a bearing 103 rotatably mounting a tubular shaft 104 which extends through bores 105 in the plate 99 and insulation 100 and terminates in a flange 106 supporting a rotor 107.

A rotor 107 includes a bottom plate 108 and a top plate 109 with a plurality of colored light transmitting panels 110 thereon said panels each preferably being of different color. In the illustrated structure, the top and bottom plate members of the rotor have five-sided peripheries with flanges 111 engaging the respective panels to aid in supporting same. It is preferable that the top and bottom members and colored panels be cemented together, but may have other suitable fastenings. The top panel has a central opening 112 aligned with the light 86 whereby light is directed into the rotor to a reflector 113 mounted in inclined relation on a shaft 114 extending through and rotatably mounted in a bore 115 in the hollow shaft 104. The reflector 113 is inclined whereby the light from the lamp 86 is reflected therefrom through the panels 110 and wall 91. The shaft 114 is preferably of suitable material having low heat conductivity and has its lower end connected to a motor shaft 116 of a motor 117 supported by hangers 118 from the bracket 102. A second motor 119 is supported by hangers 120 from the bracket 102 in laterally spaced relation to the motor 117. A sprocket 121 is secured to the shaft of the motor 119 and is operatively connected by a chain 122 to a sprocket 123 fixed on the hollow shaft 104, whereby operation of said motor 119 rotates said shaft 104. The motors 117 and 119 are preferably of a winding whereby their shafts rotate in opposite directions to provide counter-rotating of the rotor 107 and reflector 113. It is also preferable that the motor driving the rotor 107 be of slower speed than the motor driving the reflector, as, for example, a ratio corresponding to the number of colored panels in the rotor. For example, the rotor will rotate one revolution for five revolutions of the reflector whereby when observing of the light from one position, each time the reflected light is directed toward that position in response to rotation of the reflector, the next panel will have moved into position so that the reflected beam directed toward said one position is of a different color.

Electrical conductors 124 and 125 are connected to a suitable source of electric current and to each of the motors 117 and 119 to supply current thereto. The conductor 124 has a branch 126 connected by a terminal 127 to a tubular conductor 128 mounted on one of the bolt shanks 95 with an insulating bushing 129 holding the conductor 128 spaced from the shank 95. The other end of the conductor 128 is connected by a terminal 130 to a conductor 131 suitably connected to the socket 85. The conductor 125 has a branch 132 connected by a terminal 133 to a tubular conductor 134 having a non-conducting bushing 135 therein sleeved on another bolt shank, with the other end of the tubular conductor 134 connected by a terminal 136 to a conductor 137 suitably connected to the socket 85. This arrangement of the electrical connections to the light simplify the assembly of the unit.

The operation of the form of the invention illustrated in Figs. 4 to 7 inclusive, and constructed and assembled as described, is substantially the same as the operation of the form of the invention illustrated in Figs. 1 to 3 inclusive, the counter-rotation of the rotor 107 and reflector 113 causing white light from the lamp 86 to be reflected by the reflector 113 outwardly through the colored panels or lenses of the rotor to impart a color to the light that is directed through the wall 91. The counter-rotation provides an animated effect and also a moving beacon that is constantly changing color of light to attract attention to the mechanism.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. An animated light mechanism for emitting constantly changing flashes of multi-colored light comprising, spaced upper and lower housing members, a transparent wall between said upper and lower housing members and engaged therewith and defining an intermediate compartment therebetween, means in said upper housing member and directing light into said intermediate compartment, a drive shaft in said intermediate compartment, motor means operatively connected to said drive shaft for rotating same, reflecting means fixed on said drive shaft, said drive shaft and reflecting means being arranged relative to the light means and transparent wall whereby light is reflected by said reflecting means through said transparent wall, a turn table in said intermediate compartment and rotatable on the axis of the drive shaft, a plurality of semi-transparent colored panels on said turn table in a circuit about the reflecting means whereby light reflected from said reflecting means passes therethrough, and motor means operatively connected to the turn table for rotating same relative to the reflecting means whereby light is reflected by said reflecting means through said colored panels as reflecting means and colored panels pass in their rotation.

2. An animated light mechanism for emitting constantly changing flashes of multi-colored lights comprising, a support, a lower housing member on the support, a transparent wall mounted on the lower housing member and extending upwardly therefrom, an upper housing member mounted on said transparent wall in upwardly spaced relation to the lower housing member whereby said housing members and transparent wall define a chamber therebetween, a plurality of spaced elongate connecting members extending between the upper and lower housing members for securing said housing members and transparent wall together in substantially watertight relation, electric lamp means in said upper housing member and directing light into said chamber, a motor in said lower housing member, a motor shaft extending vertically into the chamber, a reflector on said motor shaft and exposed to light from said light means, said reflector being inclined for reflecting light through the transparent wall, a turn table in the chamber rotatably mounted on said motor shaft and spaced below the reflector, semi-transparent colored panels mounted around the peripheral edge of said turn table and extending vertically therefrom with their upper and lower ends spaced from the respective upper and lower housing members, motor means operatively connected with said turn table for imparting counter rotation thereto relative the rotation of said reflector whereby light is reflected by said reflector through said colored panels and transparent wall as the reflector and colored panels pass in their rotation, an electric current supply conduit connected to said motor means in said lower housing member and electrical connections extending from said electrical conduit in the lower housing member along said spaced elongate connecting members to the electric lamp means in the upper housing.

3. An animated light mechanism for emitting constantly changing flashes of multi-colored lights comprising, a support, a hollow lower housing member on the support, a peripheral flange on said lower housing member, a transparent wall mounted on the peripheral flange and extending upwardly therefrom, a hollow upper housing member mounted on the upper portion of said transparent wall thereby defining a chamber between said housing members, means for securing the upper and lower housing members and the transparent wall together in tight relationship whereby said chamber is substantially watertight, said upper and lower housing members each having an open end communicating with said chamber, means in said upper housing member and directing light into said chamber, a plate member over the open end of the lower housing member and having an opening therein, a motor in said lower housing member and having a shaft extending through said opening into the chamber, said shaft extending substantially intermediate the height of the chamber, a reflector on said motor shaft and extending therefrom, said reflector being exposed to light emitted from said light source and being inclined for reflecting light through said transparent wall, a transparent turn table in the chamber rotatably mounted on said shaft and spaced below the reflecting blades, semi-transparent colored panels mounted around the peripheral edge of said turn table and extending vertically therefrom with their upper and lower ends spaced from the respective upper and lower housing members, and motor means operatively connected to said transparent turn table for rotating same oppositely to the direction of rotation of said reflector.

4. An animated light mechanism for emitting constantly changing flashes of multi-colored lights comprising, a lower housing member, a transparent wall mounted on the lower housing member and extending upwardly therefrom, an upper housing member mounted on the upper portion of said transparent wall and thereby defining a chamber between said housing members, means directing light into said chamber, an upright drive shaft in the chamber, said drive shaft extending substantially through the chamber with its upper end spaced below the upper housing member, a substantially flat reflector secured on the drive shaft in said chamber for rotation therewith on the axis of said drive shaft, said flat reflector being inclined relative to the light directing means whereby said light is reflected through said transparent wall, a rotor supported in the chamber for rotation relative to the upright drive shaft, a plurality of semi-transparent colored panels mounted on said rotor between the flat reflector and transparent wall whereby light reflected from said flat reflector passes through said colored panels, a motor operatively connected to the rotor to rotate same in one direction, and a second motor operatively connected to the drive shaft to rotate same and the flat reflector thereon in the opposite direction and at a speed that is a multiple of the speed of rotation of the rotor, said multiple being the number of transparent colored panels on the rotor.

References Cited in the file of this patent

UNITED STATES PATENTS

| | | |
|---|---|---|
| 1,684,795 | Gnudi | Sept. 18, 1928 |
| 1,824,270 | Holzman | Sept. 22, 1931 |
| 1,878,750 | Adams | Sept. 20, 1932 |
| 1,988,569 | Rechtin | Jan. 22, 1935 |